G. N. KINSMAN.
PLOW SHARE OR LAY HOLDER.
APPLICATION FILED MAY 14, 1919.
1,312,696.
Patented Aug. 12, 1919.
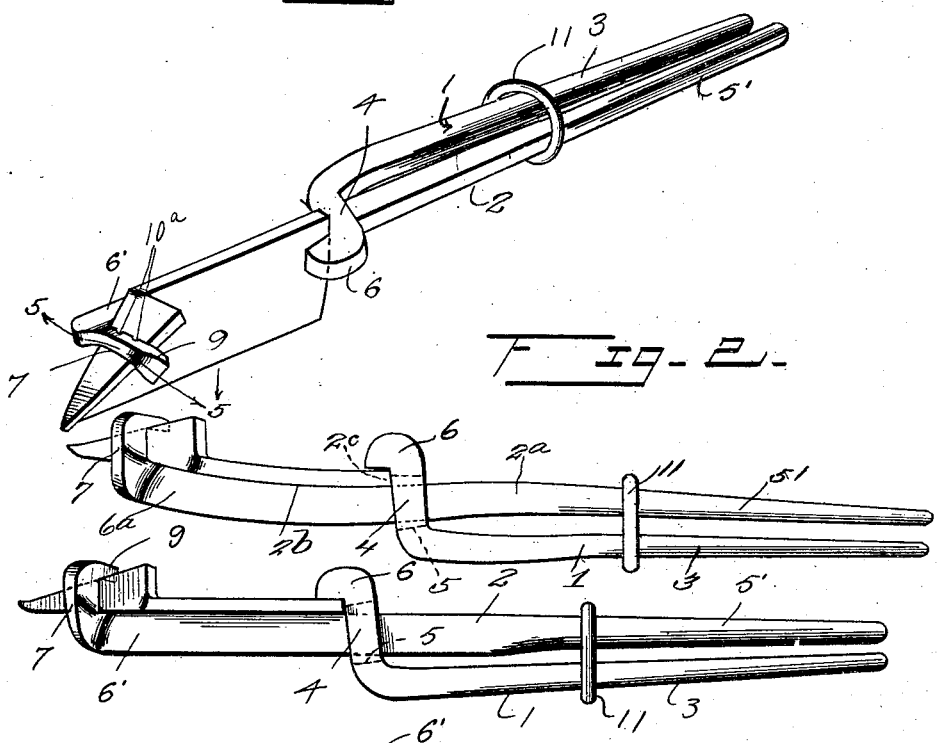
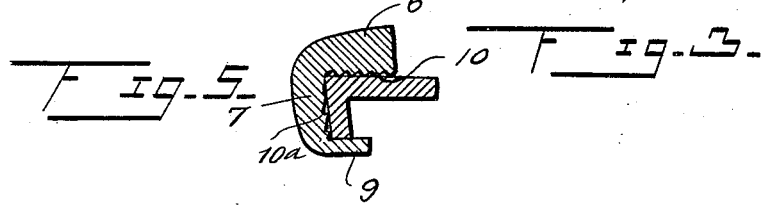
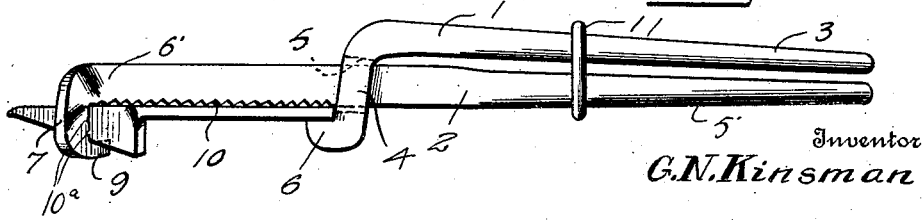
Inventor
G. N. Kinsman
By Watson E. Coleman
Attorney

UNITED STATES PATENT OFFICE.

GEORGE N. KINSMAN, OF ALPENA, SOUTH DAKOTA.

PLOW SHARE OR LAY HOLDER.

1,312,696. Specification of Letters Patent. Patented Aug. 12, 1919.

Application filed May 14, 1919. Serial No. 297,106.

*To all whom it may concern:*

Be it known that I, GEORGE N. KINSMAN, a citizen of the United States, residing at Alpena, in the county of Jerauld and State of South Dakota, have invented certain new and useful Improvements in Plow Share or Lay Holders, of which the following is a specification, reference being had to the accompanying drawings.

This invention relates to an improved holder for plow shares or lays, and an aim of the invention is to provide a device for securely holding a share or lay, during the process of hardening.

For instance, in constructing a share or lay, it is forged into the proper shape, the share being made perfectly straight, and while the share is properly heated in the forge, it is clamped securely in the holder, and then the lay or share is dipped or plunged into the water, and as a rule, when it is withdrawn from the water, the share is warped, that is when using the old style holder.

Therefore, it is an object of the present invention to provide an improved holder for the share or lay, so that after the share or lay has been dipped or plunged into the water, and then removed, the share or lay will be perfectly straight.

A further object of the invention is to provide a holder including an extra jaw member, whereby a left hand plow share or lay may be clamped in the holder as well as a right hand plow share or lay.

A further object of the invention is the provision of teeth on the edge of one of the jaws, so as to permit of water between the teeth, to insure a uniform hardening of the metal throughout the plow share or lay. However, the extra jaw member has the teeth eliminated.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in perspective showing a conventional form of right hand plow share clamped in the holder.

Fig. 2 is a plan view of a modified construction of holder, in which case the member $2^a$ is curved, so that when the plow share (which is normally straight) is arranged in position while in its heated condition, so that the share when hardening may assume the curvature of the member $2^a$, during the process of hardening.

Fig. 3 is a plan view of a conventional form of left hand plow share clamped in the holder, which is similar to the holder in Fig. 1, and showing the teeth 10 and $10^a$ eliminated from one of the jaws.

Fig. 4 is a plan view of the holder and a right hand plow share mounted therein, clearly showing the teeth of the member 2.

Fig. 5 is an enlarged detail sectional view of line 5—5 of Fig. 1.

Referring more especially to the drawings, 1 and 2 designate a pair of members, and the member 1 comprises a handle 3, a forward right angle portion 4, which is provided with an elongated slot 5, and a lug 6. The member 2 is elongated, in fact of greater length than the member 1 and comprises a handle portion 5, which is a part of the shank 6. The forward end of the shank is provided with a lateral arm 7. This lateral arm 7 is bent slightly in a plane at right angles to the lateral disposition of the arm. The arm is also partly twisted, so that the edge of the arm may conform substantially to the inclined forward edge face of the plow share, that is when the arm overlies the forward portion of the plow share. The lateral arm terminates in a lug 9, which overlies and engages the edge part of the forward inclined part of the share, that is overlies the land side of the share.

It is to be noted that this lug is bent slightly, and owing to the forward portion of the share being tapered, it is rendered impossible for the share to become detached or disconnected from the arm, when handling the tool, in order to carry the plow share through its necessary process of hardening. When the forward portion of the plow share is disposed in engagement with the arm of the member 2, the lug 6 of the member 1 is designed to clamp the rear part of the plow share or lay firmly in engagement with the member 2, as shown clearly in the drawings.

It is to be noted that either member may be adjusted relative to the other, that is, the member 2 through the slot of the right angle portion of the member 1, whereby plow shares or lays of different lengths may be clamped in the holder. It has been found that should one edge of the member 2 contact with one of the faces of the share, that is throughout the length of the share, there will not be a uniform hardening of the metal of the plow share, hence provision has been made on the member 2, in order to insure a thorough circulation of the water, where the member 2 contacts with the share. For instance, one edge of the shank of the member 2 is provided with a plurality of teeth 10, thereby allowing a thorough circulation of the water at the point where the member 2 is disposed in contact with the face of the share. In Fig. 2, it is to be noted that a holder is constructed for clamping a left hand plow share, the teeth for permitting the circulation of the water, in this instance, are eliminated, since it is observed that the member 2 engages on the land side of the share. When the two jaws are in clamping engagement with a plow share, a suitable ring 11 is fitted over the adjacent handles of the jaws, in order to clamp the jaws firmly in contact with the share. It is to be seen that the closer the ring is positioned with relation to the lateral or right angle portion of the member 1, the tighter the jaws are clamped.

The inner edge of the lateral arm 7 is also provided with notches or teeth $10^a$, serving the same function as is performed by the teeth 10. The inner edge of the lateral arm 9, where it overlies the forward portion of the share, is not in contact with the forward portion, thereby allowing a thorough circulation of water during the hardening process of the share.

It is well known that some plow shares or lays are constructed as having slightly curved backs, and in order that a plow share may harden with a curved back when being held by the holder in the present application, a member $2^a$ as illustrated in Fig. 2 may be substituted for the member 2 in Fig. 1. This member $2^a$ is curved as shown at $2^b$, and when arranging the member $2^a$ in position and inserting the normally straight plow share which is in a heated condition, a little slack is allowed at the end $2^c$, so that when the share or lay is in the process of hardening while in the holder, that is while the lay or share is cooling off and hardening, the lay or share automatically conforms to the curvature $2^b$, thereby taking up the slack. The member 2 may be easily withdrawn from the slot of the member 1, and the member $2^a$ inserted in its place, and vice versa. It is also obvious that the curvature $2^b$ may also be provided with teeth 10, if desired.

The invention having been set forth, what is claimed as new and useful is:

1. In a plow share holder, the combination with a jaw member provided with a right angle portion having a slot, of a second jaw member of greater length than the first jaw member and slidable through the slot, the end of the right angle portion having a lug, between which and the sliding jaw member, the rear end of a plow share may be clamped, one end of the sliding jaw member having a lateral curved arm overlying the forward laterally disposed inclined tapered part of the land side of the share, said arm terminating in a lug, which overlies and engages the edge of the inclined tapered part, thereby not only preventing lateral movement of the share, but also preventing movement of the share in a direction at right angles to the arm.

2. In a plow share holder, the combination with a jaw member provided with a right angle portion having a slot, of a second jaw member of greater length than the first jaw member and slidable through the slot, the end of the right angle portion having a lug, between which and the sliding jaw member, the rear end of a plow share may be clamped, and means carried by one end of the sliding jaw member, to overlie the forward end and a portion of the land side of the share, to clamp the other end of the share in engagement with the jaw members, the sliding jaw member on one edge thereof having teeth, whereby when the share is clamped in contact with the sliding jaw member a thorough circulation of water is permitted through the teeth, and means for engaging the handles of the jaw members to draw the jaw members together.

3. In a plow share holder, the combination with a jaw member provided with a right angle portion having a slot, of a second jaw member of greater length than the first jaw member and slidable through the slot, the end of the right angle portion having a lug, between which and the sliding jaw member, the rear end of the plow share may be clamped, means carried by one end of the sliding jaw member, to overlie the forward end and a portion of the land side of the share, to clamp the other end of the share in engagement with the jaw member, the clamping portion of the sliding jaw member being of a curved formation throughout its length, to the shape of which the share may conform during the process of hardening, and means for engaging the handles of the jaw members to draw the jaw members together.

In testimony whereof I hereunto affix my signature in the presence of two witnesses.

GEORGE N. KINSMAN.

Witnesses:
A. J. AISENBREY,
JOHN J. FEIOK.

Copies of this patent may be obtained for five cents each, by addressing the "Commissioner of Patents, Washington, D. C."